US010216512B1

(12) United States Patent
Mathew et al.

(10) Patent No.: US 10,216,512 B1
(45) Date of Patent: Feb. 26, 2019

(54) MANAGED MULTI-CONTAINER BUILDS

(71) Applicant: Amazon Technologies, Inc., Seattle, WA (US)

(72) Inventors: Subin Mathew, Seattle, WA (US); John Hanks, Seattle, WA (US); Clare Emma Liguori, Bainbridge Island, WA (US); Nitin Gujral, Seattle, WA (US); Joseph Silvano Vusich, Seattle, WA (US); Sandeep Dhillon, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/280,732

(22) Filed: Sep. 29, 2016

(51) Int. Cl.
*G06F 9/44* (2018.01)
*G06F 8/71* (2018.01)
*G06F 8/41* (2018.01)

(52) U.S. Cl.
CPC . *G06F 8/71* (2013.01); *G06F 8/41* (2013.01)

(58) Field of Classification Search
None
See application file for complete search history.

(56) References Cited

U.S. PATENT DOCUMENTS

| | | | |
|---|---|---|---|
| 6,810,522 B2 * | 10/2004 | Cook | G06F 9/451 717/116 |
| 2008/0059946 A1 * | 3/2008 | Harding | G06F 8/71 717/106 |
| 2017/0249141 A1 * | 8/2017 | Parees | G06F 8/70 |

* cited by examiner

*Primary Examiner* — Qamrun Nahar
(74) *Attorney, Agent, or Firm* — Davis Wright Tremaine LLP

(57) ABSTRACT

Techniques for managing multi-container builds are described herein. A software build task description specifies a build environment and the build environment specifies a set of parameters for building a version of a software object. A container is instantiated that corresponds to the build environment and build commands are sent to the container. As the container completes the build command, it sends a response that is used to determine a second command to send to the container. A status of the software build task is provided based at least in part on the response.

20 Claims, 9 Drawing Sheets

MANAGED MULTI-CONTAINER BUILDS

BACKGROUND

Modern computer systems are frequently implemented as distributed collections of computer systems operating collectively within one or more host computer system environments. Frequently, software applications must be built in such systems to support multiple environments such as, for example, multiple versions of a compiler, multiple languages, multiple different target operating systems, or to target multiple browser interfaces. Maintaining large fleets of physical hardware for such builds can be expensive as the physical hardware may stand idle for significant portions of a day, but even in situations where the physical hardware is used to build software applications frequently, maintaining such systems can be complex, expensive, and time consuming.

One solution to this physical hardware problem is to use virtual machine instances to host application builds. However, a full virtual machine instance that is dedicated to building software applications may remain idle for long periods of time and may also be complex to keep updated. Additionally, sharing resources such as source code and libraries between such builds, saving intermediate build results, synchronizing build states (so that, for example, a source code error can be quickly identified and the build cancelled), exercising such builds, and providing build results can add to the expense and complexity of such virtual application building systems. This expense and complexity can become more significant when a customer may be launching tens or even hundreds of such builds per day, causing delays, resource bottlenecks, and performance slowdowns, leading to a degraded customer experience, increased costs, and poor resource utilization.

BRIEF DESCRIPTION OF THE DRAWINGS

Various techniques will be described with reference to the drawings, in which.

DETAILED DESCRIPTION

Figure 1:
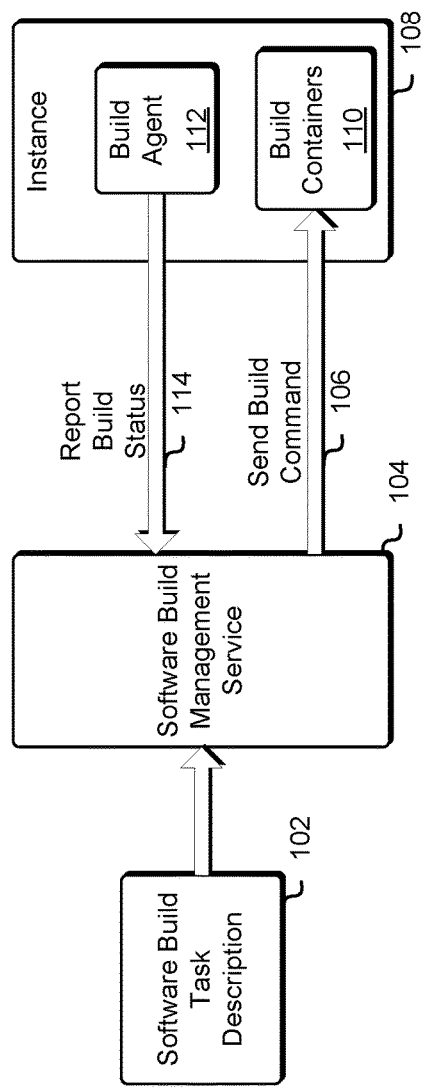
FIG. 1 illustrates an example environment where a multi-container software build is managed using a software build management service.

The following disclosure describes techniques for managing multi-container software builds using a software build management service. A customer of a computing resource services provider that provides access to computation services may describe a software build task to be performed using a set of software containers. These software containers, also referred to simply as "containers" are lightweight, virtualized execution environments for applications that are configured to be frequently reused, that typically have a short lifetime, and that execute applications to perform the software build task described.

A software build generally consists of a set of source code, instructions for the build, and build resources such as source code, libraries, target environment, and testing resources. For example, a simple "Hello World" program that writes "Hello" to a terminal or a web interface (described in more detail below), may be built for multiple languages, for multiple versions of compilers for each of those languages, for multiple destinations (i.e., terminal or web interface), and, at least for the terminal version, on multiple different operating systems. Even such a simple program can have a dozen different build specifications, and a more complex example that requires different libraries can have many more.

Additionally, each of these build specifications can have several states in the build and, keeping these states synchronized can help to avoid unnecessary work for the build. For example, a build may have a setup (or "bootstrap") state, a pre-build state, a build state, and one or more post-build states. Failure of one of these states for one of the different build specifications can be an indication that the other states, for all of the different build specifications, will also fail. For example, a syntax error in the source code for one module of many modules will cause the compilation of that module to fail during the build state.

Accordingly, it is likely that the build state for other build specifications will also fail if those other build specifications use the same source code. The techniques described in this disclosure manage builds across multiple containers and synchronize such builds so that unnecessary states in software builds for multiple environments can be avoided.

A software build task description is received at a software build management service that specifies different build environments for the software. For the purposes of clarity, the software build task description illustrated specifies a single source code file and two different versions of a compiler. The software build management service analyzes the software build task description and, from the two different versions of the compiler, determines that there are two different build environments specified, with one for each version of the compiler. In this example, a first build environment is for the first version of the compiler and a second build environment is for the second version of the compiler.

The software build management service then creates and provisions a software container for each of the build environments. Software containers allow for the efficient implementation of tasks that are executed on computer systems and applications to efficiently cohabitate on a same physical or virtual instance of a computing device. Software containers can be quickly and efficiently instantiated on instances with software specified to perform a specific part of a specific task included in the container.

In the example described above, the task is to build the software for the two different environments. Thus, one container can be instantiated for each build environment, with the software specified for each environment (i.e., one container would have one version of the compiler and another container would have the other version of the compiler). Thus, each container performs a part of the software build task. The task, when executed, instantiates the containers for the environments, performs the build commands for each of the build states, and produces the results for the environments.

As described below, the software build task is executed on an instance or set of instances with sufficient memory, central processing units ("CPU"s), and network bandwidth to perform the build. The coordination of the containers for the build and the maintaining of synchronization between builds are managed by the software build management service that sends build commands to the containers and receives status updates from a build agent running on each instance. The software build management service maintains a state machine for the builds and ensures that each state completes for each of the containers (i.e., for each of the environments) before moving to the next state.

So, using the example of a software build task with two compiler versions, the software build management service sends a command to each of the containers to enter the "bootstrap" state, where each of the containers starts up, establishes network interfaces, establishes communications with other resources such as, for example, a source code repository, and performs other such startup procedures. A build agent on each instance that is hosting software containers for the software build task monitors the containers and, when the bootstrap operations are complete for the containers on the instance, sends a status update to the software build management service indicating that the container has completed the operations for the state. When all of the containers have completed the bootstrap state (i.e., when the software build management service receives a complete state from the agent or agents for each container), the software build management service will then send a command to each of the containers to enter the next state (in this case, a "pre-build" state).

Each of the states for each container can succeed, fail, time out, or be cancelled. For example, if a pre-build state fails or times out for one container, any uncompleted pre-build states for other containers may be cancelled by the software build management service. Since the states are coordinated by the software build management service, each of the containers is in the same state, and none of the containers will move to the next state until all containers have completed the previous state. The containers can share resources (i.e., source code or data) while executing the build states and can also produce and/or share build artifacts (i.e., the results of the operations for a state) while executing the build states.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment 100 where a multi-container software build is managed using a software build management service in accordance with an embodiment. In the example illustrated in FIG. 1, a software build task description 102 is received at a software build management service 104. The software build task description 102 is, in an embodiment, a file specifying a set of software build specifications (i.e., a set of build parameters for software) for building software in multiple versions (i.e., one version for each environment). In an embodiment, a software build task description 102 can also describe a single version of software to build. The software build task description 102 may specify minimum resources required for instances where the software will be built such as, for example, memory, CPUs, network resource, or the like. The software build task description 102 may then be utilized to launch software containers (also referred to herein simply as "containers") associated with the software build task. A software build task description 102 may contain and schedule many software build tasks and may target many different build environments. In some examples, a "task" or a "software build task" may refer to an instantiation of the resources specified by software build task description 102. Software build tasks may be modified by applying a new software build task description to the software build task.

As described above, a software build generally consists of a set of source code, instructions for the build, and build resources such as source code, libraries, target environment, and testing resources. For example, a simple "Hello World" program that writes "Hello" to a terminal or a web interface (described in more detail below), may be built for multiple languages (i.e., Java™, C++, Objective C, or Ruby™), for multiple versions of compilers for each of those languages (i.e., JDK7, JDK8), for multiple destinations (i.e., terminal or web interface), and, at least for the terminal version, on multiple different operating systems (i.e., Windows™, Linux™ or MacOS™). In such an example, even a simple program that simply prints a simple greeting can have a dozen different build specifications. As may be contemplated, a more complex example that requires different libraries and resources can have significantly more different build environments.

As described herein, the software build task description 102 specifies the environments for a software build task. The software build task description 102 is used by the software build management service 104 to instantiate containers to perform the software build where each environment specified in the software build task description 102 may correspond to a container, as described below. The containers may then be managed through application programming interface ("API") calls as described herein.

An example of a software build task description 102 is:

```
jdk8:
    phases:
        pre-build:
            commands:
                - echo 'In Source Directory'
                - exec pre_build
        build:
            commands:
                - echo 'Building'
                - java HelloWorld.java
        post-build:
            commands:
                -echo 'Deploying'
                -exec post_build
    artifacts:
        type: zip
        files:
            - HelloWorld.class
```

-continued

```
jdk7:
    phases:
        pre_build:
            commands:
                - echo 'In Source Directory'
                - exec pre_build
        build:
            commands:
                - echo 'Building'
                - java HelloWorld.java
        post build:
            commands:
                -echo 'Deploying'
                -exec post_build
        artifacts:
            type: zip
            files:
                - HelloWorld.class
```

The example software build task description 102 specifies a first environment "jdk8" with pre-build, build, and post-build phases (or "states") and a second environment "jdk7" also with pre-build, build, and post-build phases (or "states"). Each of the two environments performs some pre-build operations, compiles the source code in "HelloWorld.java," and performs some post-build operations. The "jdk8" environment builds the "HelloWorld.class" file using the JDK8 compiler and the "jdk7" environment builds the "HelloWorld.class" file using the JDK7 compiler.

With the two environments specified in the software build task description 102, the software build management service 104 will first instantiate build containers 110 on an instance 108. In an embodiment, each of the build containers 110 can contain other build containers and/or other build agents. The software build management service 104 may be a collection of computing resources that operate collectively to process software build task descriptions to perform software build tasks as described herein by providing and managing container instances where the software build tasks and the associated containers can be executed. The computing resources configured to process software build task descriptions and provide and manage container instances where the software build tasks and the associated containers can be executed include at least one of: computer systems (the computer systems including processors and memory), networks, storage devices, executable code, services, processes, modules, or applications. The computing resources configured to process software build task descriptions and provide and manage container instances where the software build tasks and the associated containers can be executed may include virtual systems that are implemented on shared hardware hosted by, for example, a computing resource service provider. The software build management service 104 may be implemented as a single system or may be implemented as a distributed system, with a plurality of instances operating collectively to process software build task descriptions and provide and manage container instances where the software build tasks and the associated containers can be executed. The software build management service 104 may operate using computing resources (e.g., other services) that enable the software build management service 104 receive software build task descriptions, instantiate container instances, communicate with container instances, and/or otherwise manage container instances. The software build management service 104 may also use a container management service, as described herein, to instantiate container instances, communicate with container instances, and/or otherwise manage container instances.

The software build management service 104 may be a service provided by a computing resource service provider to allow a customer of the computing resource service provider to execute tasks using containers on container instances as described below. The computing resource service provider may be a computing resource service provider similar to the computing resource service provider 210 described in connection with FIG. 2, and may provide one or more computing resource services to its customers individually or as a combination of services of a distributed computer system. The one or more computing resource services of the computing resource service provider may be accessible over a network and may include services such as virtual computer system services, block-level data storage services, cryptography services, on-demand data storage services, notification services, authentication services, policy management services, task services and/or other such services. Not all embodiments described include all of the services described, and additional services may be provided in addition to, or as an alternative to, services explicitly described.

As one example, the computing resource service provider may be an entity that provides computing resources, such as data storage services, virtual computer system services, and/or web services. Customers of the computing resource service provider may communicate with one or more of the services via an interface, which may be a web services interface or any other type of customer interface. Each service provided by a computing resource service provider may have its own interface and subsets of the services may have corresponding individual interfaces in addition to a common interface or as an alternative to a common interface.

In some examples, a "container instance" (or, more simply, an "instance") may refer to a computer system instance (virtual or non-virtual, such as a physical computer system running an operating system) that is configured to launch and run software containers. Thus, the container instance may be configured to run tasks in containers in accordance with the software build task description provided by the customer. One or more container instances may comprise an isolated cluster or group of containers. In some examples, "cluster" may refer to set of one or more container instances that have been registered to (i.e., as being associated with) the cluster. Thus, a container instance may be one of many different container instances registered to the cluster, and other container instances of the cluster may be configured to run the same or different types of containers. The container instances within the cluster may be of different instance types or of the same instance type. A customer of a computing resource service provider may have more than one cluster. Thus, the customer may launch one or more clusters and then manage user and application isolation of the containers within each cluster through application programming interface calls.

A container (also referred to as a "software container") may be a lightweight virtual machine instance running under a computer system instance that includes programs, data, and system libraries. When the container is run (or executed), the running program (i.e., the process) is isolated from other processes running in the same computer system instance. Thus, containers may each run on an operating system (e.g., using memory, CPU, and storage allocated by the operating system) of the container instance and execute in isolation from each other (e.g., each container may have an isolated view of the file system of the operating system). Each of the containers may have its own namespace, and applications running within the containers are isolated by only having access to resources available within the container namespace. Thus, containers may be an effective way to run one or more single applications within their own namespace. A container encapsulation system allows one or more containers to run within a single operating instance without overhead associated with starting and maintaining virtual machines for running separate user space instances.

The containers may be launched to have only specified resources from resources allocated to the container instance; that is, a container may be launched to have a certain amount of memory and to not utilize more than a specified amount of processing power. For example, a software build task description 102 may specify two CPUs but that the container for an application cannot exceed fifty percent of those two CPUs. The resource allocation for the containers may be specified in the software build task description 102. Multiple containers may run simultaneously on a single host computer or host container instance, and the resources of the host can be allocated efficiently between the containers using this system. In an embodiment, a host supports running containers in container instances from only one customer (referred to herein as a "single-tenant" environment). In other embodiments, a single host may allow multiple customers to have container instances running on the host (referred to herein as a "multi-tenant" environment). In the latter case, the container service may provide security to ensure that the customers are unable to access containers, clusters, or container instances of the others. Container instances may be instantiated as needed or maintained in a "warm pool" of such container instances that are available to host containers for software build tasks.

Different types of software build tasks may have different resource parameters and may have different lifespans. Thus, containers may be dynamically scheduled to run by a scheduler service independent of an underlying operating system of the container instance and, as such, the underlying operating system of a container instance may be very basic. Alternatively, containers may be scheduled to run by a scheduler installed on the container instance, and resource allocation and assignment may be assigned by such a scheduler. The underlying operating system of such a container may be more complex.

When a software build management service 104 has instantiated build containers 110 on an instance 108, the software build management service 104 may perform the software build task as described herein. The example software build task description illustrated above has two build environments and, as described below, has two corresponding build containers 110. The software build management service 104 may, based at least in part on a state machine associated with the build process, send a build command 106 to the build containers 110 on the instance 108. In an embodiment, the software build management service 104 or a user of the software build management service 104 (e.g., the customer 202 described in connection with FIG. 2) provides a set of shared data that the instantiated build containers 110 use to complete the software build task described in the software build task description 102.

The build commands may instruct each of the build containers 110 to begin performing one or more operations associated with a state (or phase) of the build. Using the example illustrated above, the software build management service would first send a build command 106 to each of the build containers 110 to, for example, begin the "pre-build" state. Each of the build containers 110 would then perform the operations specified for the "pre-build" state (e.g., would echo "In Source Directory" and would exec (or execute) the "pre build" command). A build agent 112 on the instance 108 may then monitor the build containers 110 and, as each build container completes the operations specified for the "pre-build" state, would report the build status 114 to the software build management service 104, the build status 114 indicating whether the software build task completed and/or also indicating, for example, whether the software build task succeeded, failed, timed out, or was cancelled.

The build agent 112 on the instance may be a collection of computing resources that operate collectively to monitor software build tasks on containers as described herein. The computing resources configured to monitor software build tasks on containers include at least one of: computer systems (the computer systems including processors and memory), networks, storage devices, executable code, services, processes, modules, or applications. As illustrated herein, the build agent operates on the instance where the containers are hosted. In an embodiment, the agent or a component thereof operates on a computer system that is different from the instance where the containers are hosted. The computing resources where the build agent 112 can be executed may include virtual systems that are implemented on shared hardware hosted by, for example, a computing resource service provider. The build agent 112 may be implemented as a single entity or may be implemented as a distributed entity, with a plurality of agents operating collectively to monitor software build tasks on containers. The build agent 112 may operate using computing resources (e.g., other services) that enable the build agent 112 to receive notifications, communicate with container instances, and/or otherwise monitor build asks and their associated container instances. The build agent 112 and/or the build containers 110 may also use a container management service, as described herein, to instantiate container instances, communicate with container instances, and/or otherwise manage container instances.

When all build containers 110 have completed the "pre-build" state, the software build management service 104 may then determine the next state. If, for example, all of the build containers 110 successfully complete the "pre-build" state, the software build management service 104 may then send a build command 106 to the build containers 110 on the instance 108 to begin the "build" state. Conversely, if one or more of the build containers 110 fails to complete the "pre-build" state because, for example, there is an error or a timeout, the software build management service 104 may not send a build command 106 to any of the build containers 110 on the instance 108 to begin the "build" state and may instead send a build command 106 to the build containers to cancel any "pre-build" commands that are still running.

Figure 2:
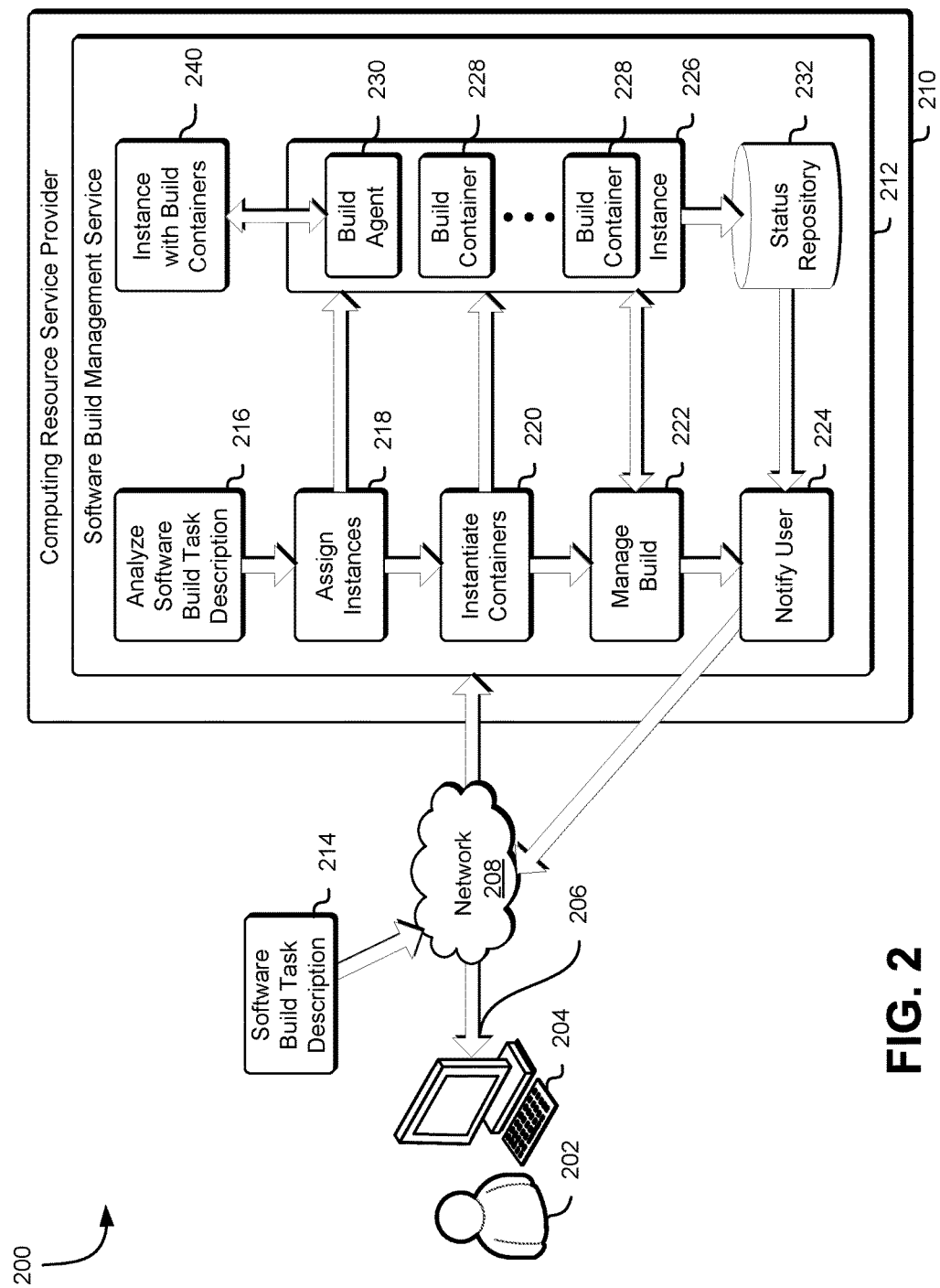
FIG. 2 illustrates an example environment where a multi-container software build is managed for a customer of a computing resource service provider using a software build management service.

FIG. 2 illustrates an example environment 200 where a multi-container software build is managed for a customer of a computing resource service provider using a software build management service, as described in connection with FIG. 1, and in accordance with an embodiment. In the example environment 200 illustrated in FIG. 2, a user 202 may use a client computing device 204 to connect 206 to a variety of services provided by a computing resource service provider 210. The user 202 may use the client computing device 204 to connect 206 to the computing resource service provider 210 over a network 208 such as those networks described herein. The computing resource service provider 210 may provide a distributed, virtualized, and/or datacenter environment within which one or more applications, processes, services, virtual machines, and/or other such computer system entities may be executed. The user 202 may be a person, or may be a process running on one or more remote computer systems, or may be some other computer system entity, user, or process.

Commands from the user 202 to the computing resource service provider 210 may originate from an outside computer system or from within the computing resource service provider environment. The commands to connect 206 to the computing resource service provider 210 may be sent to the computing resource service provider 210 and/or the services operating in the environment therein, without the direct intervention of the user 202 (i.e., commands to connect 206 to the computing resource service provider 210 may be generated automatically in response to one or more events). The user 202 may be a privileged user associated with a customer of the computing resource service provider 210. The user 202 may also be a privileged user associated with the computing resource service provider 210.

The computing resource service provider 210 may provide access to one or more host machines, may provide access one or more virtual machine instances as may be operating thereon, or may provide access to one or more services in an environment therein. The one or more services provided by the computing resource service provider 210 may also be implemented as and/or may utilize one or more virtual machine instances as may be operating on host machines operating within the computing resource service provider 210 environment. For example, the computing resource service provider 210 may provide a variety of services to users including, but not limited to, the user 202. The users may communicate with the computing resource service provider 210 via an interface such as a web services interface or any other type of interface. While the example environment illustrated in FIG. 2 shows a single connection or interface to the computing resource service provider 210, each of the services operating in an environment therein may have its own interface and, generally, subsets of the services may have corresponding interfaces in addition to or as an alternative to the single interface.

In an example of a type of service operating within the environment of the computing resource service provider 210, a virtual computer system service may be a collection of computing resources configured to instantiate virtual machine instances on behalf of a customer such as the user 202. The customer may interact with a virtual computer system service (via appropriately configured and authenticated API requests) to provision and operate virtual machine instances that are instantiated on physical computing devices hosted and operated by the computing resource service provider 210. The virtual computer system service may also be configured to manage virtual machine instances to, for example, instantiate virtual machine instances and/or to manage the migration of virtual machine instances. The virtual machine instances may be used for various purposes, such as to operate as servers supporting a web site, to operate business applications or, generally, to serve as computing power for the customer. Other applications for the virtual machine instances may be to support database applications, electronic commerce applications, business applications, and/or other applications.

As described above, a software build management service 212 of a computing resource service provider 210 may first receive a software build task description 214 that, in the example illustrated in FIG. 2, is provided by the user 202 using the client computing device 204 used to connect 206 to the computing resource service provider 210 over a network 208. The software build management service 212 may first analyze the software build task description 216 as described above to determine how many instances and how many containers are required, based at least in part on the different environments specified in the software build task description 214, to perform the software build task. As a result of that analysis, the software build management service 212 may assign instances 218 to the user 202 that can be used to execute the software build task. The instances that the software build management service 212 assigns (i.e., the instance 226) will then be used by the software build management service 212 to instantiate containers 220. Instances may be selected from an instance pool, the instance pool including one or more running instances available to host build containers. The selected instances are assigned to the task (also referred to herein as being assigned to the user 202) by the software build management service 212 or by a container management service as described herein. The software build management service 212 then uses the instance 226 and the build containers 228 to launch the software build task (i.e., to instantiate the build containers on the instance 226, also referred to herein as an "assigned instance"). Although not illustrated in FIG. 2, the instance 226 may have one or more containers monitored by the build agent 230. The instance 226 may also be a container and may, itself, host other containers and/or build agents.

In the example illustrated in FIG. 2, the instance 226 has a plurality of build containers 228 (e.g., one for each environment) and a build agent 230. The software build management service 212, or a container management service as described herein, uses the build containers 228 used to launch the software build task specified in the software build task description 214. The software build management service 212 then manages the build 222 by sending build commands to the build containers 228 according to the build state, as described herein. The build agent 230 then monitors the build containers 228 and reports the build status to the software build management service, the build status indicating whether the software build task completed and/or also indicating, for example, whether the software build task succeeded, failed, timed out, or was cancelled. In the example illustrated in FIG. 2, the build agent reports the build status by saving it to a status repository 232 that may be read by the software build management service 212. Finally, the software build management service 212 may notify 224 the user 202 of the status of the software build task, including updating the user 202 as the status changes. In an embodiment, the notification includes access to the task and/or the containers using, for example, a uniform resource locator ("URI") and/or a web interface, where the access thereto is reported to the user 202 via the network 208 using the connection 206 via the client computing device 204.

In the example illustrated in FIG. 2, the build agent 230 monitors additional instances with build containers 240 when, for example, the resources of the instance 226 are not sufficient to instantiate all of the build containers specified in the software build task description. As with the instance 226, each of the instances with build containers 240 may also have a single container and/or may be a single container.

Figure 3:
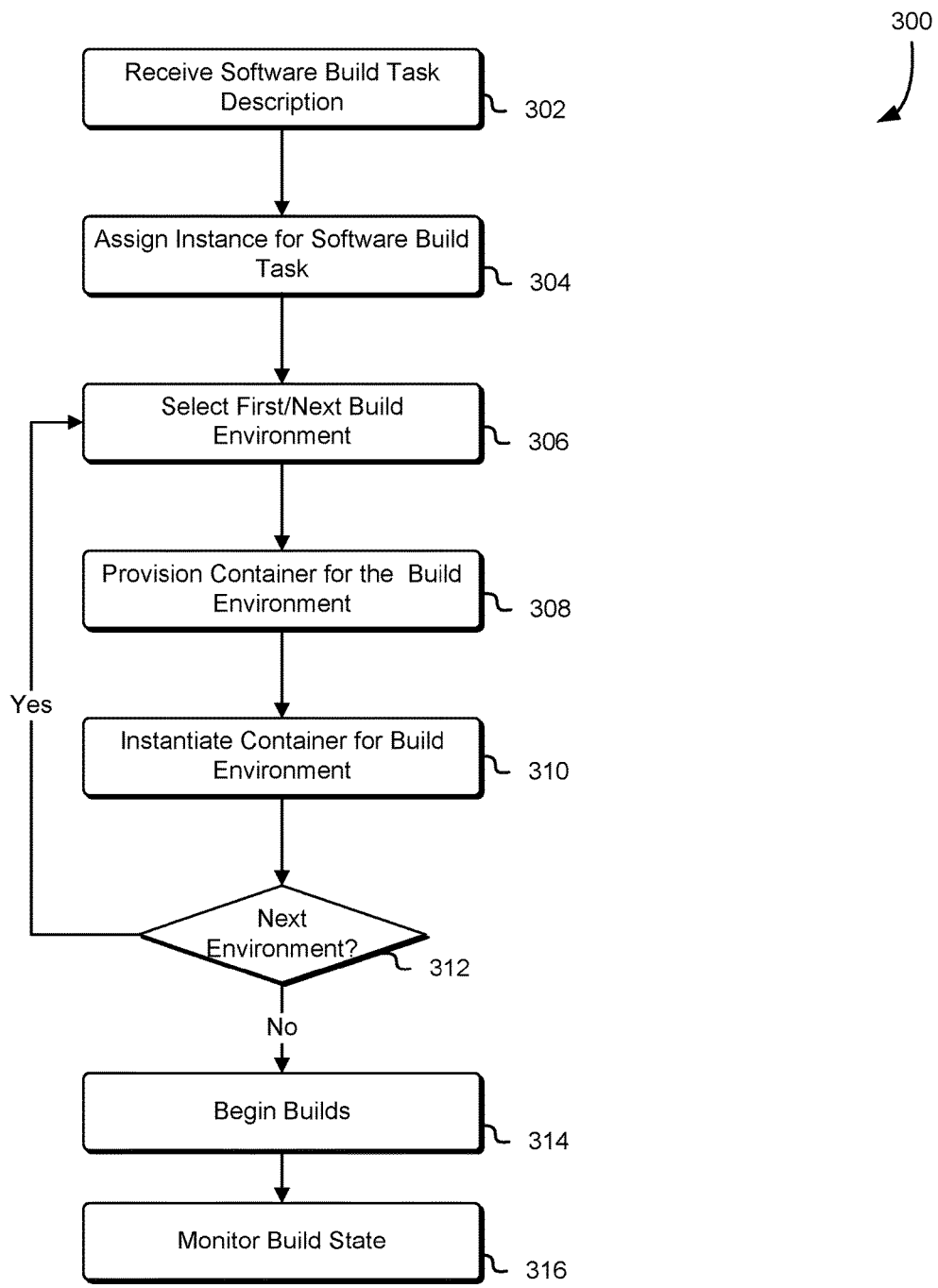
FIG. 3 illustrates an example process for managing a multi-container software build using a software build management service.

FIG. 3 illustrates an example process 300 for managing a multi-container software build using a software build management service as described in connection with FIG. 1 and in accordance with an embodiment. A software build management service, such as the software build management service 104 described at least in connection with FIG. 1, may perform the example process 300 illustrated in FIG. 3. The software build management service may first receive 302 a software build task description, which may specify a software object to build in one or more environments, as described above. The software build management service may then provision and assign 304 an instance to host the software build.

The software build management service may then select 306 the first build environment from the software build task description. For example, the first build environment can specify a compiler, a compiler version, a language, libraries to include in the software build, data, unit tests, integration tests, regression tests, or other such build environment parameters. The software build management service may then, based at least in part on the software build environment of the selected build environment (i.e., the first build environment), provision 308 a container for the build environment, as described above. Using the example build environment "jdk8" illustrated and described above, the software build management service may provision 308 a container with libraries and a compiler that can be used to build the "HelloWorld.class" file from the "HelloWorld.java" file, for JDK8.

Once the container is provisioned to perform the software build for the environment, the software build management service may then instantiate 310 the container on the assigned instance and may next determine 312 whether there are more environments to provision and instantiate containers for. If the software build management service does determine 312 that there are more environments to provision and instantiate containers for, the software build management service may select 306 the next environment and provision 308 and instantiate 310 containers for that next build environment.

If the software build management service does not determine 312 that there are more environments to provision and instantiate containers for, the software build management service may next begin 314 the software builds for the containers by issuing build commands and monitoring 316 the build state for the software build task, as described herein.

Figure 4:
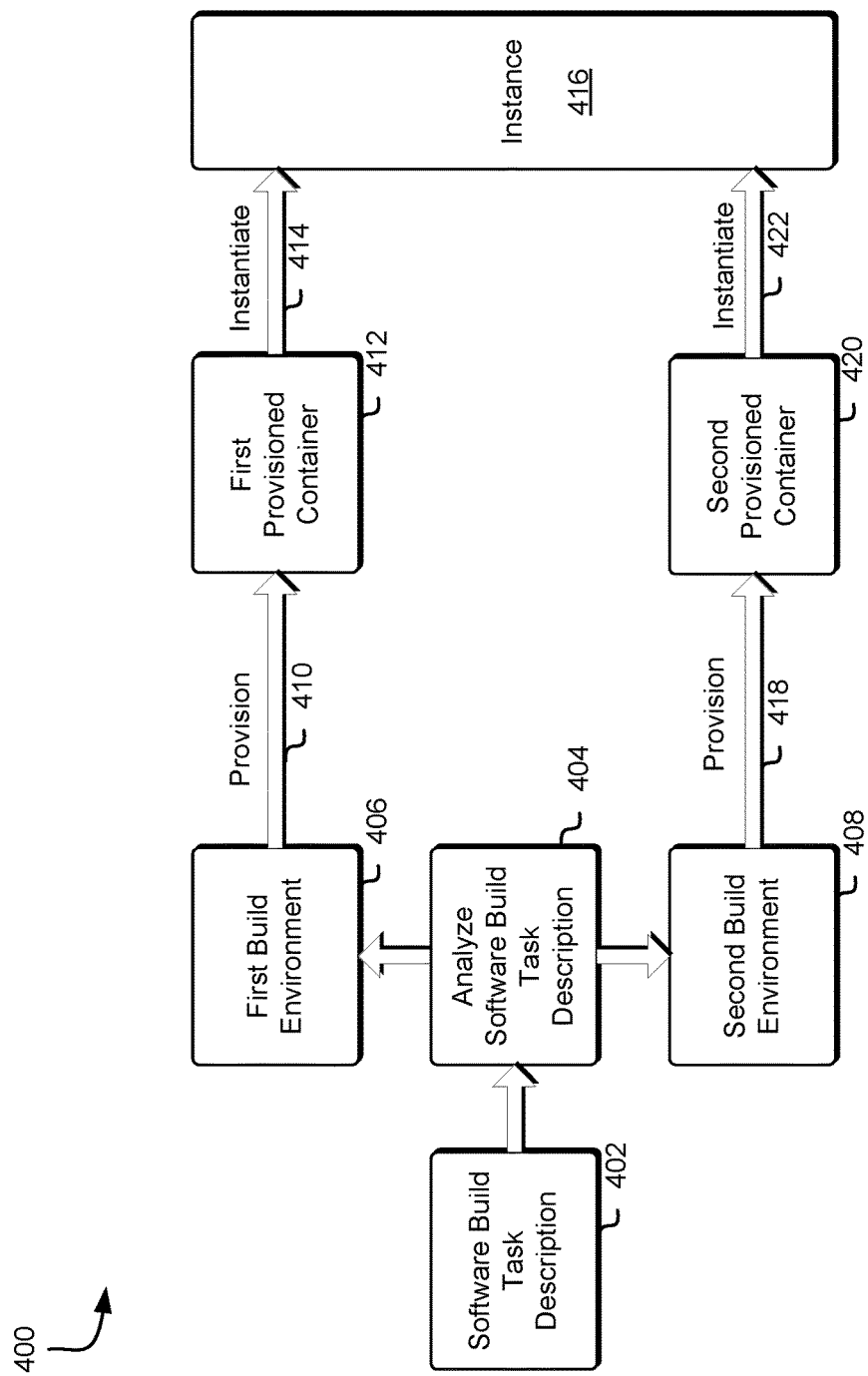
FIG. 4 illustrates an example environment where containers are provisioned for a multi-container software builds using a software build management service.

FIG. 4 illustrates an example environment 400 where containers are provisioned for multi-container software builds using a software build management service, as described in connection with FIG. 1, and in accordance with an embodiment. In the example environment 400 illustrated in FIG. 4, a software build task description 402 is received and the software build task description is analyzed 404 by, for example, a software build management service as described herein. In the example illustrated in FIG. 4, the software build task description 402 has two build environments. The first build environment 406 (e.g., the "jdk8" environment) is the basis for a first container. The software build management service may provision 410 the container based on the first build environment 406 to generate the first provisioned container 412 that may then be instantiated 414 on the instance 416, as described above. Similarly, the second build environment 408 (e.g., the "jdk7" environment) is the basis for the second container. Accordingly, the software build management service may next provision 418 the container based on the second build environment 408 to generate the second provisioned container 420 that may then be instantiated 422 on the instance 416, also as described above. It should be noted that while the example illustrated in FIG. 4 shows two build environments and two provisioned containers, any number of build environments and provisioned containers may be considered as within the scope of the present disclosure. It should also be noted that, while the example illustrated in FIG. 4 shows one container for each environment, in an embodiment a plurality of containers can be used to build a software object for a particular environment.

Figure 5:
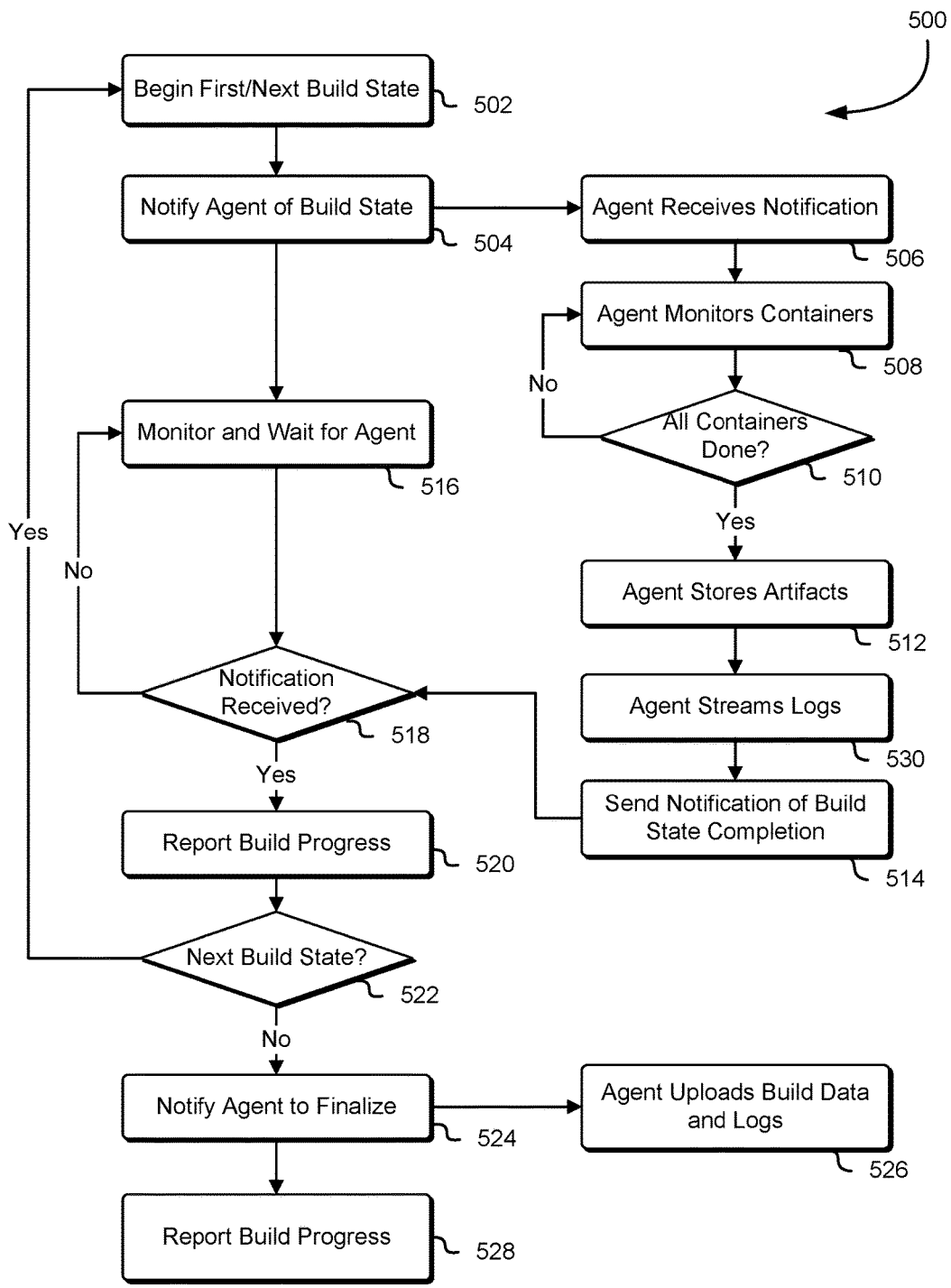
FIG. 5 illustrates an example process for monitoring a multi-container software build using a software build management service.

FIG. 5 illustrates an example process 500 for monitoring a multi-container software build using a software build management service, as described in connection with FIG. 1, and in accordance with an embodiment. A software build management service such as the software build management service 104, described at least in connection with FIG. 1, may perform a first part of the example process 500 illustrated in FIG. 5. A build agent, such as the build agent 112 described at least in connection with FIG. 1, may perform a second part of the example process 500 illustrated in FIG. 5.

First, a software build management service may begin 502 a first/next build state on one or more build containers as described above. For example, if there are two environments in a software build task description, then there may be two containers, one corresponding to each build environment. Accordingly, the software build management service may begin 502 a first/next build state on those two containers. As described above, the one-to-one correspondence between build environments and build containers is used herein merely for illustrative purposes and, in some embodiments, a larger number of containers can be used for each environment. The software build management service may begin 502 a first/next build state using one or more build containers by sending a command to the one or more build containers (i.e., a command to begin the selected build state).

In the example process 500 illustrated in FIG. 5, the software build management service may next notify 504 an agent running on an instance that hosts the one or more build containers that the first/next build state has begun. In an embodiment, the container build management service does not separately notify 504 the agent of the beginning of the build state and, instead, the agent (also referred to herein as a "build agent") receives such notification using a different method. For example, the agent may monitor communications in and out of the instance and may determine, based on the command sent by the software build management service, that the build state has begun.

When the agent receives 506 the notification that the build state has begun, the agent may next monitor 508 the containers on the instance and, based at least in part on such monitoring, may determine 510 whether the build state has completed. For example, an agent may monitor 508 the commands executed within the container and, based at least in part on the software build task description, may determine 510 whether the build state has completed based at least in part on the commands executed within the container. The agent may also monitor one or more resources associated with the container to determine 510 whether the build state has completed. The agent may also monitor a timer to determine 510 whether the build state has timed out (i.e., that a set time for the build state has been exceeded). This timeout constitutes a form of completion for the build state. That is, whether the build state succeeds, fails, times out, or is cancelled (for example, by a customer or by the software build management service), the agent can use this success, failure, timeout, or cancellation to determine 510 that the build state has completed.

If the agent does determine 510 that the build state has completed, the agent may store 512 any build artifacts of the build state (e.g., the "HelloWorld.class" file generated by the JDK7 compiler or the JDK8 compiler) and may then send 514 a notification that the build state has completed to the software build management service. In an embodiment, the agent streams 530 any build logs (i.e., logs of build events) to a storage service for processing by the software build management service after the agent stores the build artifacts and before the agent sends the notification. If the agent does not determine 510 that the build state has completed, the agent may continue to monitor 508 the container as described above.

After the software build management service does notify 504 the agent of the beginning of the build state (in an embodiment where the software build management service does send such a notification), the software build management service may monitor communications with the agent and wait 516 for the agent to send 514 the notification that the build state has completed. If the software build management service does determine 518 that the notification from the agent is received, the software build management service may next report 520 the build progress based at least in part on the notification received. If the software build management service does not determine 518 that the notification from the agent is received, the software build management service may continue to monitor communications with the agent and wait 516 for the agent to send 514 the notification that the build state has completed.

The software build management service may report 520 the build progress for each build state or may report 520 the build progress for only some of the build states. For example, a software build management service may report 520 the build progress for the "pre-build," "build," and "post-build" states by may not "bootstrap" state. The software build management service may report 520 the build progress by writing the build progress to a terminal, by posting the build progress using a web services interface, by sending a notification to a customer of the computing resource service provider, or by some other such notification method.

The software build management service may next determine 522 what is the next build state according to a state machine of next build states associated with the software build management service. An example state machine is illustrated below in FIG. 6.

If the software build management service does determine 522 that there is a next build state, the software build management service may begin 502 the next build state as described above. Conversely, if the software build management service does not determine 522 that there is a next build state because, for example, all build states have succeeded, or because a build state has timed out for one or more containers, or because a build has been cancelled, or because a build state has failed for one or more containers, the software build management service may notify 524 the agent to finalize the build and may report 528 the build progress as described above. In an embodiment, the software build management service includes a final status of the software build such as, for example, failed, succeeded, timed out, or cancelled with the report. In another embodiment, the final status includes a location of the one or more build artifacts of the software build, as described above. When the agent receives the notification to finalize the build, the agent may do so by, for example, uploading 526 any build data and logs to a repository.

Figure 6:
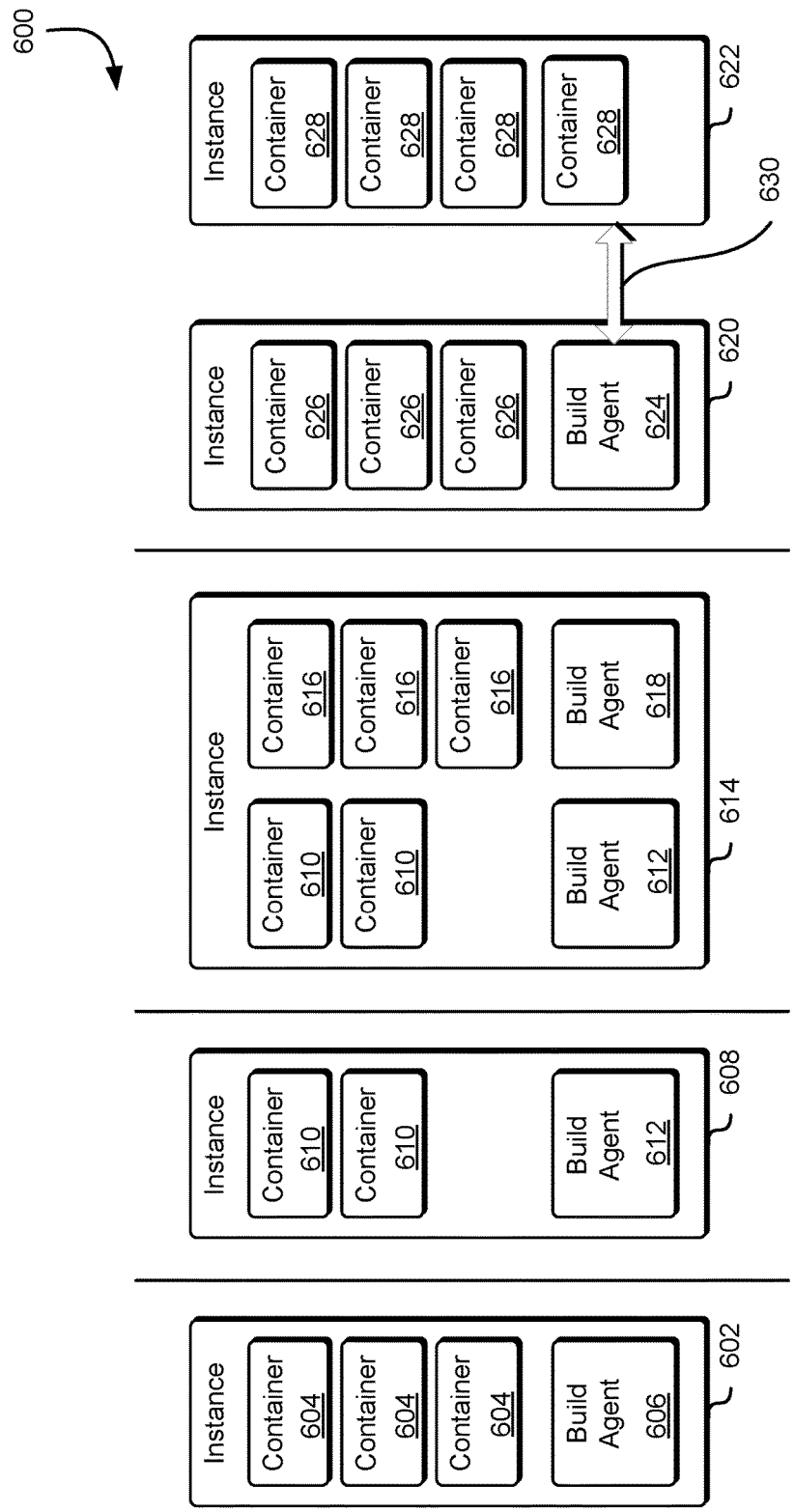
FIG. 6 illustrates an example environment where a container instance is reused for multi-container software builds using a software build management service.

FIG. 6 illustrates an example environment 600 where a container instance is reused for multi-container software builds using a software build management service, as described in connection with FIG. 1, and in accordance with an embodiment. An instance 602 may have three containers 604 instantiated on the instance with a build agent 606. The three containers 604 instantiated on the instance, which are associated with one or more environments, are used to build one or more versions of a software object according to a software build task description, as described herein. After those three containers 604 have completed their builds, two containers 610 may be instantiated on the instance 608 (which, in this example, is the same as the instance 602) with a build agent 612. The two containers 610 may belong to the same customer associated with the three containers 604 if the instance 608 has been assigned to that customer.

Before the two containers 610 complete their software build, three more containers 616 may be instantiated on the instance 614 (which, in this example, is the same as instance 602 and instance 608) with a build agent 618. The instance 614 has two build agents (i.e., build agent 612 and build agent 618) because there are two builds being executed on the instance. In an embodiment, the two containers 610, the build agent 612, the three containers 616, and the build agent 618 are all associated with the same customer.

The instance 620 has three containers 626 with a build agent 624 as described above. Additionally, the instance 622 has four more containers 628 that are monitored 630 by the build agent 624. As described above, the number of environments, and thus the number of containers, for a software build may exceed the resources of a single instance. Consequentially, the multiple instances (i.e., instance 620 and instance 622) may be used to host the additional containers (i.e., the three containers 626 and the four more containers 628).

Figure 7:
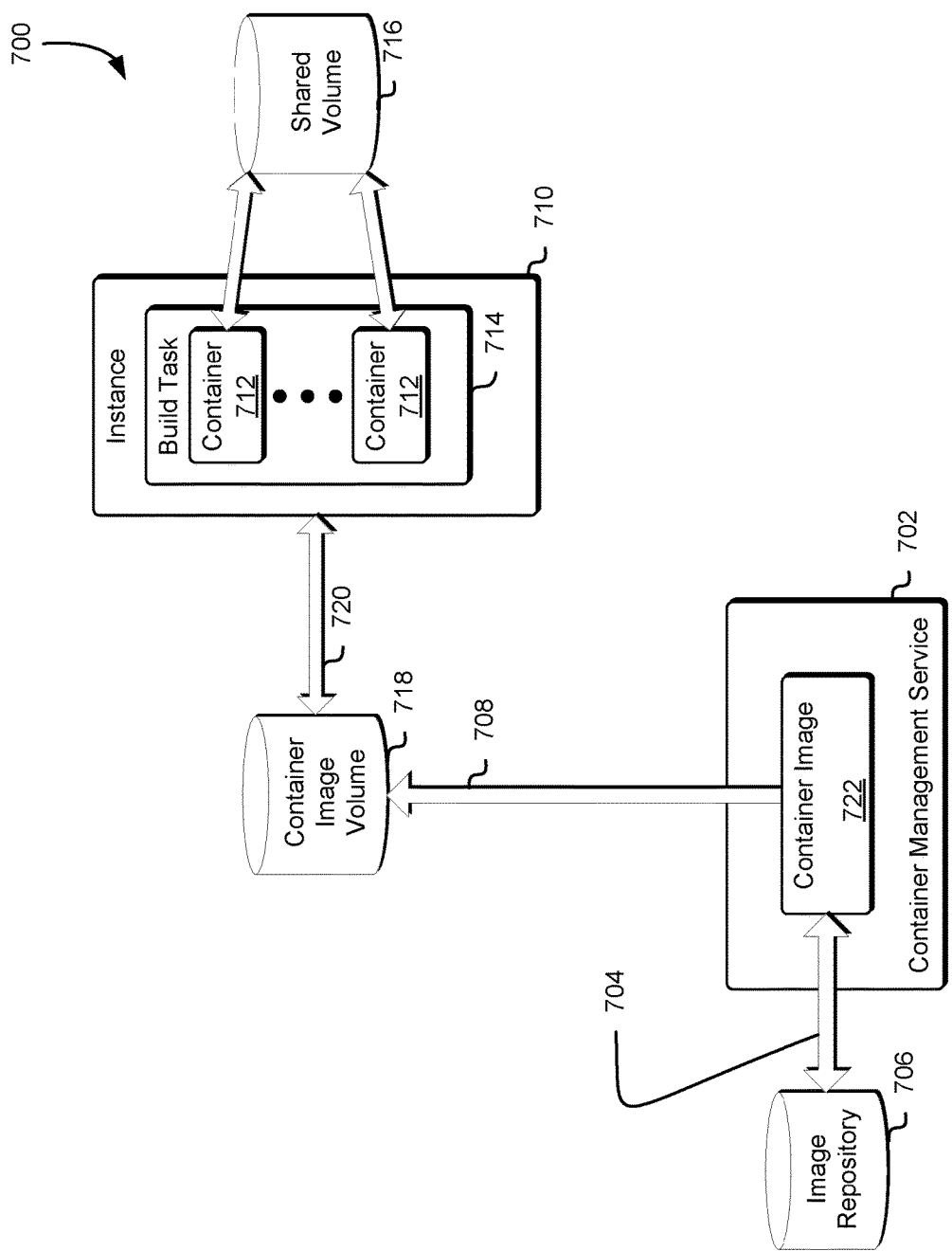
FIG. 7 illustrates an example environment where a container instance is provisioned for use in a multi-container software build using a software build management service.

FIG. 7 illustrates an example environment 700 where a container instance is provisioned for use in a multi-container software build using a software build management service, as described in connection with FIG. 1, and in accordance with an embodiment. In the example illustrated in FIG. 7, a container management service 702 may retrieve 704 a container image 722 from an image repository 706 in response to a software build management service as described above. A container image 722 is an image of a container that may be used to instantiate the container. A container image 722 contains the software and data needed to operate the container. So, for example, a container image 722 may contain an operating system for the container, drivers for the container to interface with the container instance, software that can be executed, data, and one or more scripts that, when executed, cause the container to perform actions associated with the task. An image repository 706 is a searchable repository of such container images. A container image may, for example, be specified for each environment of a plurality of environments so that the container image contains the compilers and libraries for a particular build environment.

The container management service 702 may then copy 708 the container image 722 to container image volume 718. A container image volume 718 is a storage device that is either physical or virtual and that contains one or more container images. The container image volume 718 may be mounted 720 (i.e., operationally attached to the instance using the operating system of the instance) on an instance such as the instance 710. The container image volume 718 can then be used by the instance 710 to instantiate the containers 712 associated with the task 714. Although not illustrated in FIG. 7, the task 714 may have a network interface as described above. In the example illustrated in FIG. 7, the instance has a shared volume 716 which may contain software (i.e., source code), libraries, data, content, or other data and/or metadata that may be shared between the containers 712 and/or shared between the build states of the containers.

Figure 8:
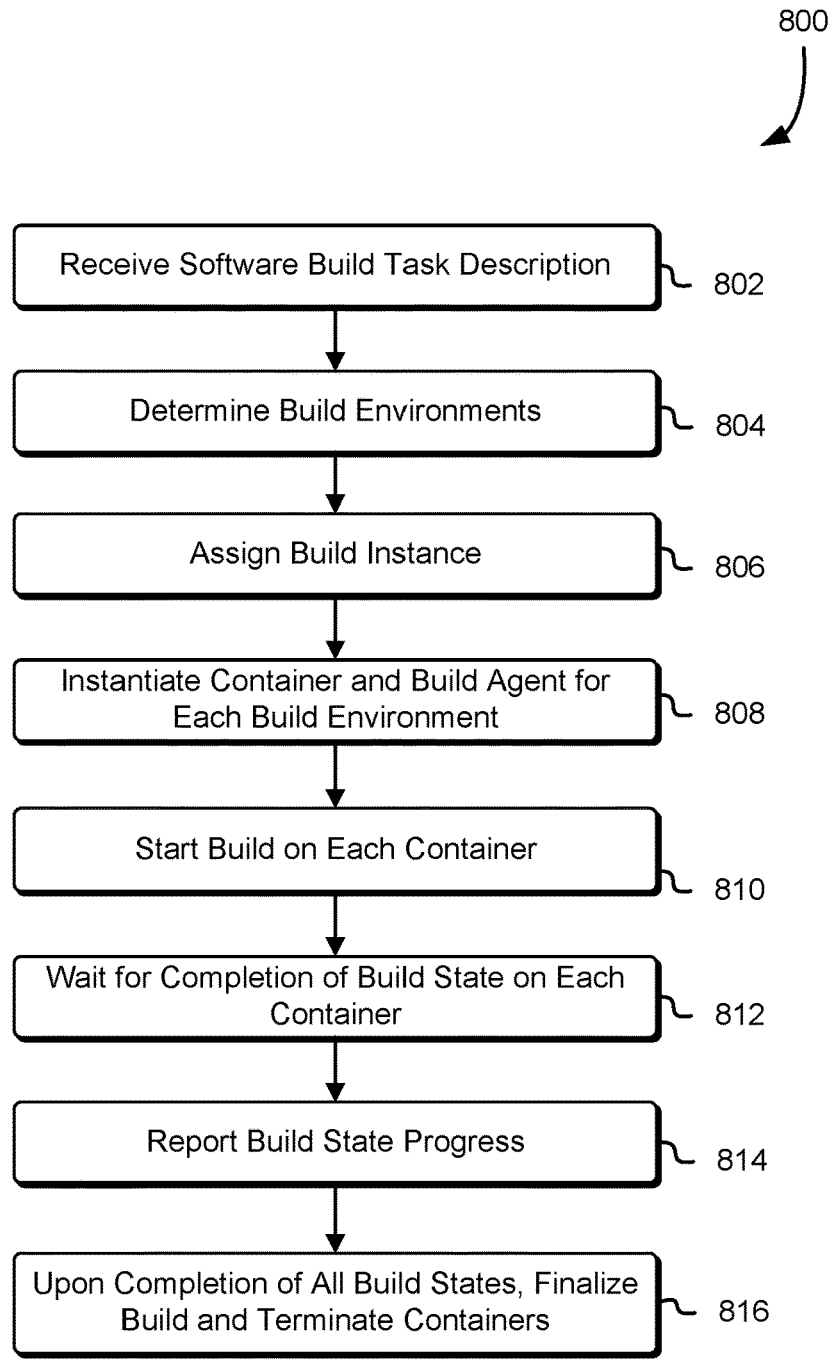
FIG. 8 illustrates an example process for managing multi-container software builds using a software build management service.

FIG. 8 illustrates an example process 800 for managing a multi-container software build using a software build management service, as described in connection with FIG. 1, and in accordance with an embodiment. A software build management service such as the software build management service 104, described at least in connection with FIG. 1, may perform the example process 800 illustrated in FIG. 8. The software build management service may first receive 802 a software build task description and, based at least in part on that software build task description, may determine 804 one or more build environments that may be used to build a version of a software object.

The software build management service may then assign 806 a build instance to a customer associated with the software build task description (i.e., the customer that requested the software build) and may instantiate 808 one or more containers for each build environment and one or more corresponding build agents. In an embodiment, the software build management service instantiates one container for each build environment. In another embodiment, the software build management service instantiates a plurality of containers for each build environment. In another embodiment, the software build management service instantiates one or more containers for a subset of the build environments. Next, the software build management service may start 810 a software build on each container as described above by sending build commands to the containers. The software build management service may then wait 812 for completion of the build state on each container (i.e., may wait for all to complete the operations associated with the build state), may report 814 the build progress as described above, and upon completion 816 of all build states, may finalize the build and, in some embodiments, terminate the containers by sending a terminate command to the containers.

Figure 9:
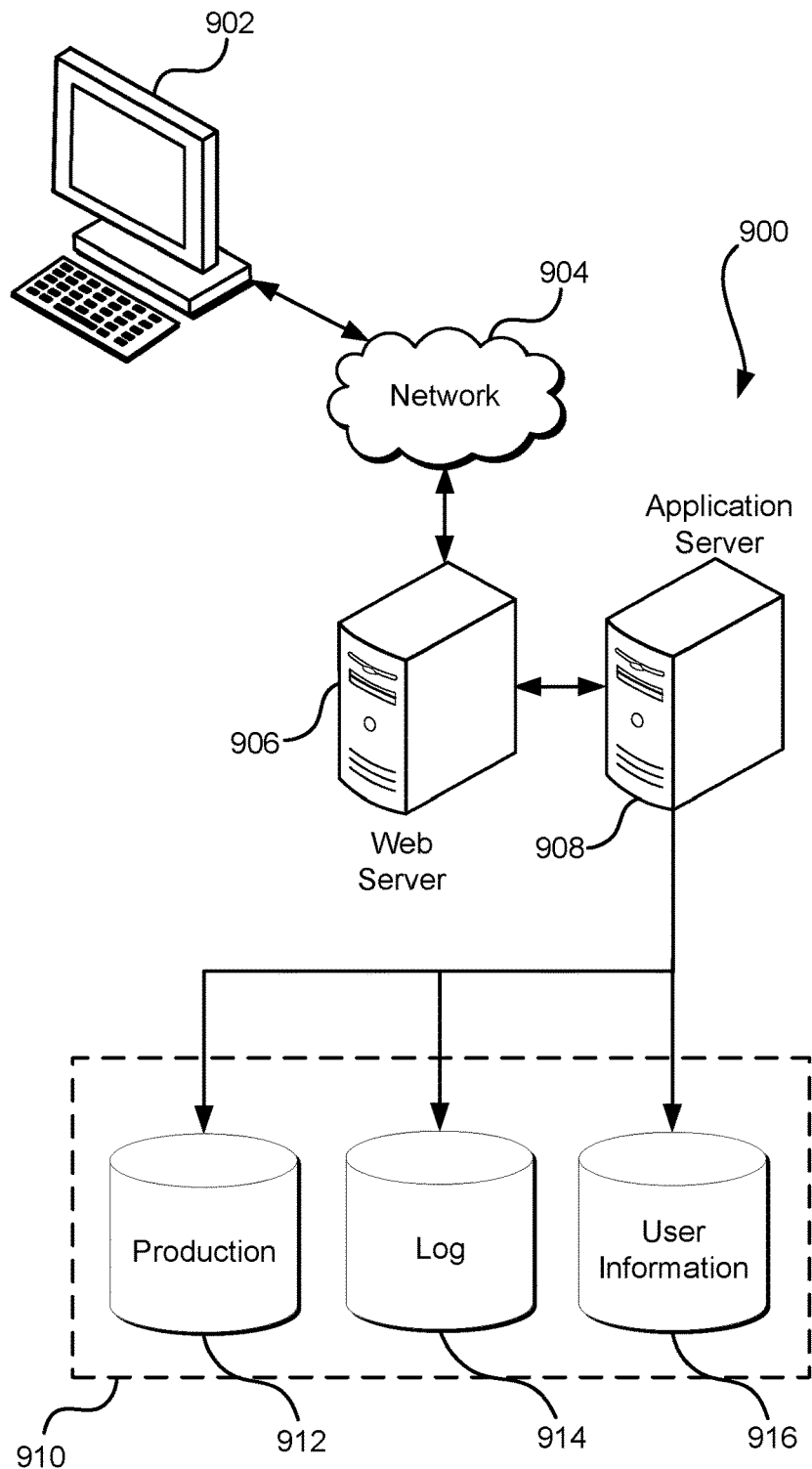
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update, or otherwise process data in response thereto. The application server 908 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system in the example environment 900 in FIG. 9 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase °, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for managing multi-container builds, comprising:
    under control of one or more computer systems configured with executable instructions,
        receiving, at a software build management service, a software build task description, the software build task description specifying a software object to build, the software build task description including a set of environments, each environment of the set of environments specifying a corresponding set of parameters usable to build a corresponding version of the software object;
        instantiating, for each environment of the set of environments, a corresponding container of a set of containers on a build instance of one or more build instances, each build instance of the one or more build instances associated with the software build task, the corresponding container based at least in part on one or more parameters of the set of parameters;
        for a selected build state of a set of build states of the software build management service:
            sending, for each environment of the set of environments, a command to the corresponding container of the set of containers, the command based at least in part on the build state and the environment;
            receiving, from the corresponding container of each environment of the set of environments, a corresponding response to the command;
            waiting until the corresponding response to the command is received from the corresponding container for all environments of the set of environments; and
            determining the next build state of the set of build states; and
        providing a build status of the software build task, the build status indicating whether the software build task completed.

2. The computer-implemented method of claim 1, further comprising:
    instantiating a build agent on a selected build instance of the one or more build instances;
    receiving, using the build agent, the command sent to the corresponding container of the set of containers;
    monitoring, using the build agent, the set of containers; and
    providing, using the build agent, the response to the corresponding command.

3. The computer-implemented method of claim 1, wherein, upon receiving the response to the corresponding command, a second build status based at least in part on the response is provided, the second build status indicating whether the corresponding command completed.

4. The computer-implemented method of claim 1, wherein instantiating, for each environment of the set of environments, a corresponding container includes:
    copying a container image from a repository to a container image volume, the repository containing one or more container images;
    mounting the container image volume on the instance; and
    instantiating the container using the container image.

5. The computer-implemented method of claim 4, wherein the container image is provided by a customer of a computing resource service provider.

6. A system, comprising:
    a computing device configured with:
        one or more processors; and
        memory that stores instructions that, as a result of execution by the one or more processors, cause the computing device to:
            instantiate a container on a build instance, the container provisioned based at least in part on an environment specified in a software build task description, the environment specifying a set of parameters usable to build a version of a software object for the environment;
            send a first build command of a set of build commands to the container, the first build command based at least in part on a state of the software build task to build the version of the software object;
            obtain a response to the first build command;
            determine a second build command of the set of build commands based on the response, the second build command indicating a next state of the software build task to build the version of the software object;
            send the second build command to the container; and
            provide a status of the software build task to build the version of the software object based at least in part on the response.

7. The system of claim 6, wherein an agent running on the build instance monitors the container to detect one or more operations associated with the first build command and provides the response to the first build command.

8. The system of claim 7, wherein the agent receives the first build command and receives the second build command.

9. The system of claim 6, wherein the environment is one of a plurality of environments.

10. The system of claim 6, wherein the container is one of a plurality of containers provisioned based at least in part on the environment specified in the software build task description.

11. The system of claim 10, wherein:
the build instance is one of a plurality of build instances; and
each container of the plurality of containers is instantiated on a corresponding build instance of the plurality of build instances.

12. The system of claim 6, wherein the second build command is a terminate command, the terminate command causing the container to stop executing.

13. A non-transitory computer-readable storage medium having stored thereon executable instructions that, as a result of being executed by one or more processors of a computer system, cause the computer system to at least:
instantiate one or more containers on build instance, the one or more containers provisioned based at least in part on an environment specified in a software build task description, the environment specifying a set of parameters usable to build a version of a software object for the environment, the one or more containers having a set of shared data associated with the software build task;
send a first build command of a set of build commands to each container of the one or more containers, the first build command based at least in part on a state of the software build task, the first build command configured to use the set of shared data to build the version of the software object;
wait for a response to the first build command from each container of the one or more containers;
send a second build command of the set of build commands to each container of the one or more containers, the second build command configured to use the set of shared data to build the version of the software object, the second build command based at least in part on the response to the first build command from the corresponding each container; and
provide a status of the software build task based at least in part on the response.

14. The non-transitory computer-readable storage medium of claim 13, wherein the software build task description specifies a plurality of environments.

15. The non-transitory computer-readable storage medium of claim 13, wherein the environment specifies a set of parameters usable to build a version of a software object, the software object specified in the software build task description.

16. The non-transitory computer-readable storage medium of claim 13, wherein an agent running on the build instance monitors the one or more containers to detect one or more operations associated with the first build command and provides the response based at least in part on the one or more operations.

17. The non-transitory computer-readable storage medium of claim 13, wherein the instructions further comprise instructions that, as a result of being executed by the one or more process, cause the computer to generate a final status of the software build task, the final status indicating a build status of the software build task, the build status of the software build task including at least one of: failed, succeeded, timed out, or cancelled.

18. The non-transitory computer-readable storage medium of claim 17, wherein the final status includes a location of a build artifact generated as a result of the software build task.

19. The non-transitory computer-readable storage medium of claim 13, wherein the status of the software build task is provided to a customer associated with the software build task using a web services interface.

20. The non-transitory computer-readable storage medium of claim 13, wherein the build instance selected from one or more instances running in an instance pool.

* * * * *